(12) United States Patent
Chandra et al.

(10) Patent No.: US 10,986,642 B2
(45) Date of Patent: Apr. 20, 2021

(54) APPLICATION-SPECIFIC AIRTIME FAIRNESS IN WLANS (WIRELESS LOCAL ACCESS NETWORKS) BASED ON TIME SENSITIVITY OF APPLICATIONS (71) Applicant: Fortinet, Inc., Sunnyvale, CA (US)

(72) Inventors: Sekhar Sumanth Gorajala Chandra, Fremont, CA (US); Zhiyong Sun, Santa Clara, CA (US)

(73) Assignee: Fortinet, Inc., Sunnyvale, CA (US)

( * ) Notice: Subject to any disclaimer, the term of this patent is extended or adjusted under 35 U.S.C. 154(b) by 102 days.

(21) Appl. No.: 16/454,001

(22) Filed: Jun. 26, 2019

(65) Prior Publication Data

US 2020/0213991 A1    Jul. 2, 2020

Related U.S. Application Data

(63) Continuation-in-part of application No. 16/236,641, filed on Dec. 31, 2018, now Pat. No. 10,716,027.

(51) Int. Cl.
*H04W 72/04*    (2009.01)
*H04W 72/10*    (2009.01)
*H04L 12/927*   (2013.01)
*H04L 12/873*   (2013.01)
*H04L 12/875*   (2013.01)
*H04W 84/12*    (2009.01)

(52) U.S. Cl.
CPC ......... *H04W 72/048* (2013.01); *H04L 47/527* (2013.01); *H04L 47/56* (2013.01); *H04L 47/803* (2013.01); *H04W 72/10* (2013.01); *H04W 84/12* (2013.01)

(58) Field of Classification Search
CPC ... H04W 72/10; H04W 72/048; H04W 84/12; H04L 47/527; H04L 47/56; H04L 47/803
See application file for complete search history.

(56) References Cited

U.S. PATENT DOCUMENTS

2017/0366467 A1* 12/2017 Martin ................ H04L 47/6265

\* cited by examiner

*Primary Examiner* — Jianye Wu
(74) *Attorney, Agent, or Firm* — Law Office of Dorian Cartwright; Dorian Cartwright (57) ABSTRACT

Network packets are pre-processed and stored in network queues based on time sensitivity and other factors. More specifically, a specific application associated with a specific session of the network packets locally at the access point is determined. An ATR is adjusted based on a priority of the application with respect to time sensitivity. Other factors include throughput capability of a wireless device.

3 Claims, 5 Drawing Sheets

APPLICATION-SPECIFIC AIRTIME FAIRNESS IN WLANS (WIRELESS LOCAL ACCESS NETWORKS) BASED ON TIME SENSITIVITY OF APPLICATIONS

CROSS-REFERENCE TO RELATED APPLICATIONS

This application claims priority under 35 USC 120 as a continuation-in-part of pending U.S. application Ser. No. 16/236,641 filed Dec. 31, 2018, entitled EXTENDING AIRTIME FAIRNESS IN WLAN S(WIRELESS LOCAL ACCESS NETWORKS) WITH SELECTIVE DYNAMIC ALLOCATIOUN OF QUANTUM by Ravikiran Malamkali et al. the contents of which being hereby incorporated in its entirety.

FIELD OF THE INVENTION

The invention relates generally to computer networking improvements, and more specifically, to extending application-specific airtime fairness in WLANS (wireless local access networks) based on time-sensitivity of applications.

BACKGROUND

Wi-Fi standards continually evolve from legacy protocols such as IEEE (Institute of Electrical and Electronic Engineers) 802.11a, IEEE 802.11b and IEEE 802.11g to newer protocols such as IEEE 802.11n and IEEE 802.11 ac. To this end, wireless stations leveraging newer protocols are able to receive better network performance due to higher throughput and other improved conditions.

Problematically, access points serving a heterogeneous mix of legacy wireless stations and newer wireless stations are slowed down by the legacy devices. To overcome this issue, many wireless vendors implemented airtime fairness in a vendor-specific manner for clients. One common technique is to allocate a time slot, or a quantum (measured in micro seconds), to for channel access to each wireless station. The quantum is typically equal and constant for each client, allowing faster clients to have higher throughput within the quantum. On the other hand, there is no discrimination between different wireless stations.

Furthermore, different applications have different time sensitivities. The current processes nevertheless treat all of these applications the same.

Therefore, what is needed is a robust technique for extending application-specific airtime fairness in WLANS based on time-sensitivity of applications. Allocations can be based on, for example, applications in use, location, and roles and privileges.

SUMMARY

These shortcomings are addressed by the present disclosure of methods, computer program products, and systems for extending airtime fairness in WLANS with selective dynamic allocation of quantum.

In one embodiment, a set of default priority parameters is stored. The default parameters include a default airtime fairness ratio (ATR), for network traffic on the data communication network. Network packets associated with a plurality of sessions for network applications executing on the plurality of stations are received. The network packets are stored in a queue.

In one embodiment, the network packets are pre-processed and stored in network queues based on time sensitivity and other factors. More specifically, a specific application associated with a specific session of the network packets locally at the access point without deep packet inspection is determined. The specific application determination can be based at least in part on a source IP address, a source port address, a destination IP address, a destination port address and a protocol.

In another embodiment, the ATR is adjusted on a per-application session basis. The adjustment based on time sensitivity of an application. For example, making a first ATR adjustment responsive to detecting a time sensitivity of a first application to be high and a throughput of a first station to be low. In another example, making a second ATR adjustment responsive to detecting a time sensitivity of a second application to be low and a throughput requirement of the second application to be high. In a final example, making a third ATR adjustment responsive to detecting a time sensitivity of a third application to be low and a throughput requirement of the third application to be low.

Network packets can be queued in time slots for processing based on the adjusted ATR. Further down the pipeline, network packets are processed by a network processor or CPU, for the specific session of an application using packets in the queue. Next, network packets are transmitted across the channel of the data communication system. Advantageously, network computer hardware performance and specifically, processing performance is improved and network performance is improved for applications with the airtime fairness techniques.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for extending airtime fairness in WLANS based time sensitivity of a particular application executing on a wireless station. One of ordinary skill in the art will recognize that many other scenarios are possible, given the present disclosure, as discussed in more detail below.

I. Systems to Prevent Extend Airtime Fairness in WLANS Based on Application Time Sensitivity (FIGS. 1-2)

Figure 1:
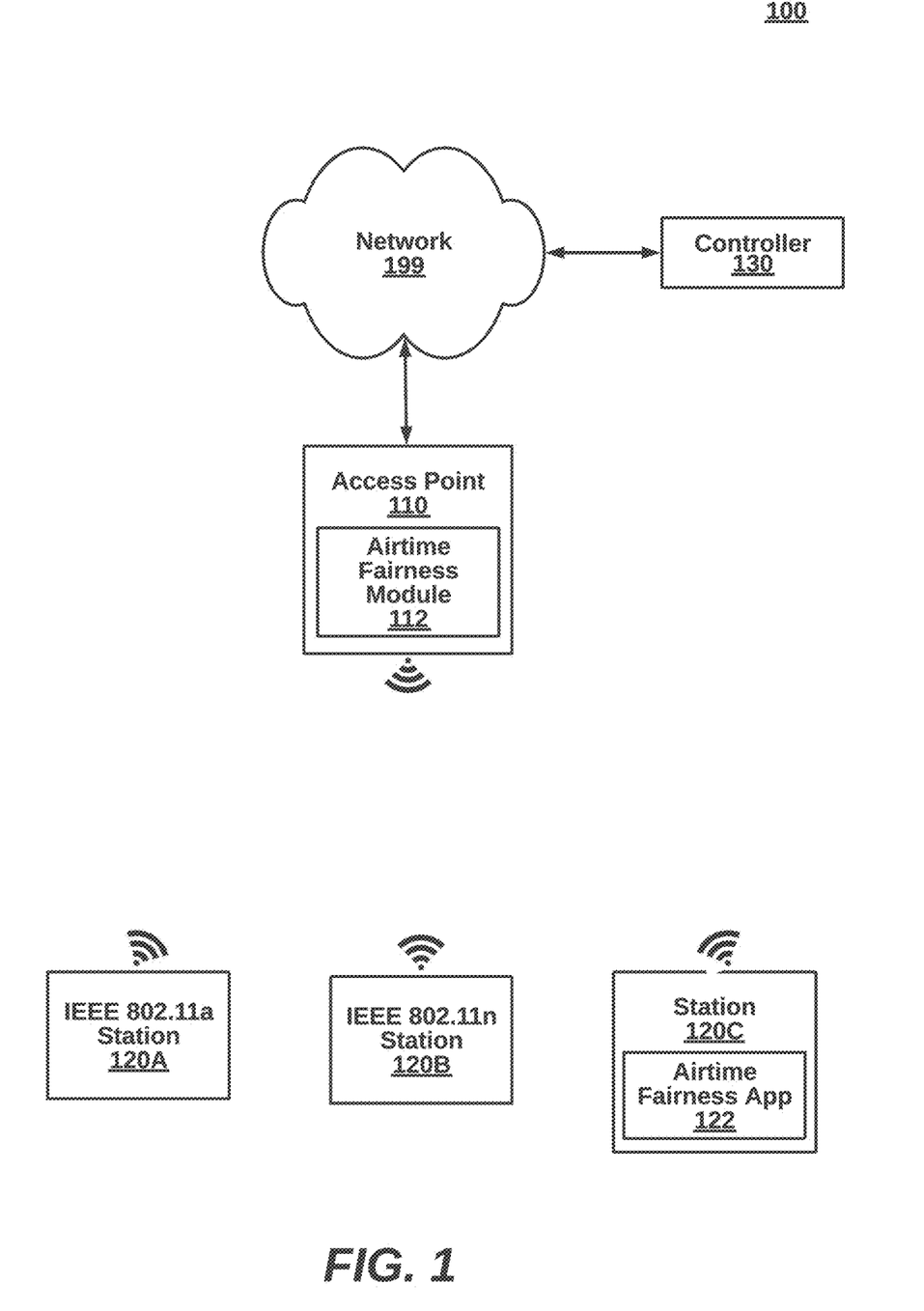
FIG. 1 is a high-level block diagram illustrating a system to extending application-specific airtime fairness in WLANS based on time-sensitivity of applications, according to one embodiment.
Figure 2A:
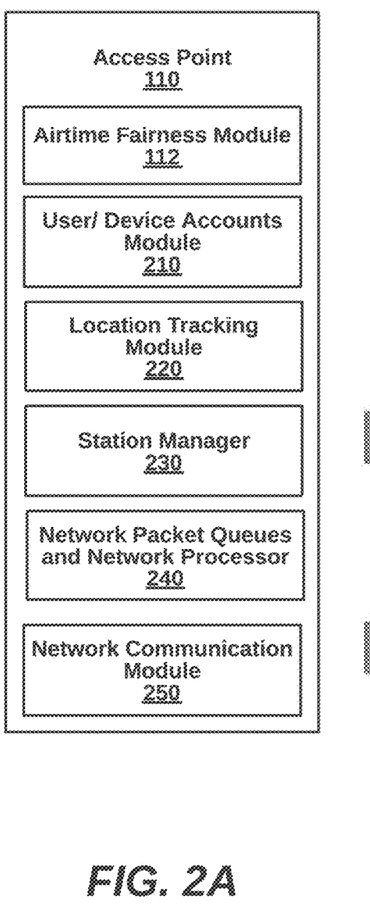
FIGS. 2A and 2B are more detailed diagrams illustrating internal components of an access point from the system of FIG. 1, according to some embodiments.
Figure 2B:
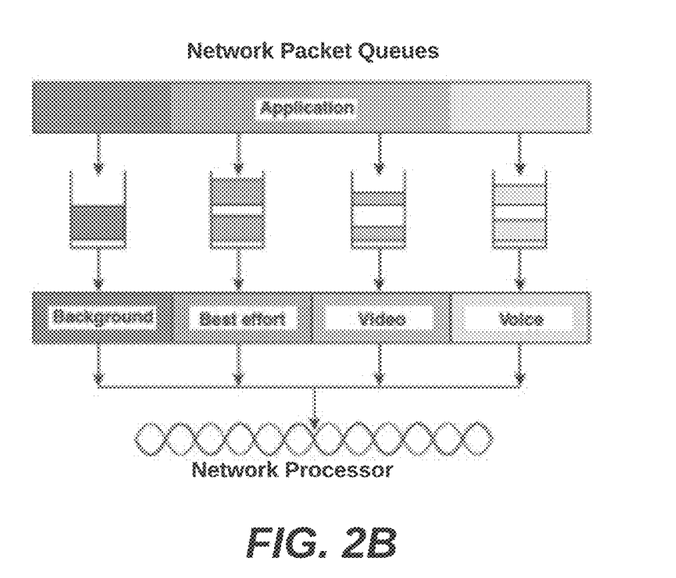

FIG. 1 is a high-level block diagram illustrating a system 100 to extend airtime fairness in WLANS with selective dynamic allocation of quantum (ATR) based on time sensitivity of applications, according to one embodiment. The system 100 comprises an access point 110, wireless stations 120A-C, and controller 130. Many other configurations are possible. For example, additional network components can also be part of the system 100, such as firewalls, virus scanners, routers, switches, application servers, databases, and the like. Each of the components in the system 100 are communicatively coupled through the network 199.

Network 199 can be the Internet, a WAN, a LAN, a Wi-Fi, or other type of data communication network providing a data channel for components of the system 100. Control of the network can be by a business organization, a government agency, or an individual household, without limitation to other possibilities. The components can use data channel protocols, such as IEEE 802.11a/b/g/, IEEE 802.11 n, 802.11ac, or other versions of the 802.11 and other wireless standards. Referring specifically to FIG. 1, the access point 110 is coupled across the network 199 preferably over wired connections. In turn, the stations 120A-C are coupled to the access point 110, preferably over wireless connections.

The access point 110 further comprises an airtime fairness module 112 to modify ATR within sessions of network packets. Without using DPI (deep packet inspection), the airtime fairness module 112 is able to identify applications and users from the network packets. The airtime fairness module 112 selectively adjusts quantum for a device, for an application, for a user, or for a far-away device, as non-limiting examples. The adjustments can be based on organizational priorities set to define treatment based on a client's application, location, and/or roles and privileges.

In one embodiment, the airtime fairness module 1112 provides an application-level perspective of airtime fairness by making time sensitivity of each application a factor in airtime fairness. For example, if time sensitivity is high but throughput of the station is low, then more airtime can be awarded. On the other hand, time sensitivity is high, but throughput requirements of an application are low, no adjustment is necessary. Further, if time sensitivity is low and throughput of a wireless station is high, then less airtime can be awarded. Similarly, if time sensitivity is low, and the throughput requirement of an application is low, less airtime can be awarded.

Specific applications can be assigned specific priorities based on time sensitivity, in an example implementation. For example, Skype would typically be detected as background or best effort traffic. Instead, the airtime fairness module 112 can detect the application as VOIP and ensure high priority. Different applications can be treated differently. Different sessions of the same application can be treated differently. FIG. 2B shows a how specific applications are sent to different queues with different priorities. In contrast, Table 9.1 below shows a standard queuing without consideration of time sensitivity of applications.

TABLE 9-1

UP-to-AC mappings

| Priority | UP (Same as 802.1D user priority) | 802.1D designation | AC | Designation (informative) |
|---|---|---|---|---|
| Lowest | 1 | BK | AC_BK | Background |
|  | 2 | — | AC_BK | Background |
| ↓ | 0 | BE | AC_BE | Best Effort |
| Highest | 3 | EE | AC_BE | Best Effort |
|  | 4 | CL | AC_VI | Video |
|  | 5 | VI | AC_VI | Video |
|  | 6 | VO | AC_VO | Video |
|  | 7 | NC | AC_VO | Video |

In another embodiment, user roles and privileges are a factor in airtime fairness. In one implementation, there are no adjustments made to default airtime fairness parameters for a guest user or for an unknown device (e.g., clients get equal preference in airtime). On the other hand, a president of an entity, a senior network administrator performing a critical task, or certain types of devices can be given the best possible network privileges, using adjustments to airtime fairness parameters for the identified characteristic. One embodiment downgrades airtime fairness based on the identified characteristic by reducing airtime through less favorable airtime fairness parameters (e.g., ATR downgraded for social media applications).

In an embodiment, the access point 110 off-loads airtime fairness determinations to the controller 130. From the perspective of the controller 130, performing airtime fairness determinations for multiple access points allows uniform implementation of network policies with standardized decision logic. In addition to the access point 110, there can be several other access points under management of the controller 130. By having contact with multiple access points, the controller 130 is able to track a specific user or a specific device as it moves around different rooms in a building services by different access points. The controller 130 can ensure consistent airtime performance (e.g., ATR) throughout the changes in location.

Figure 5:
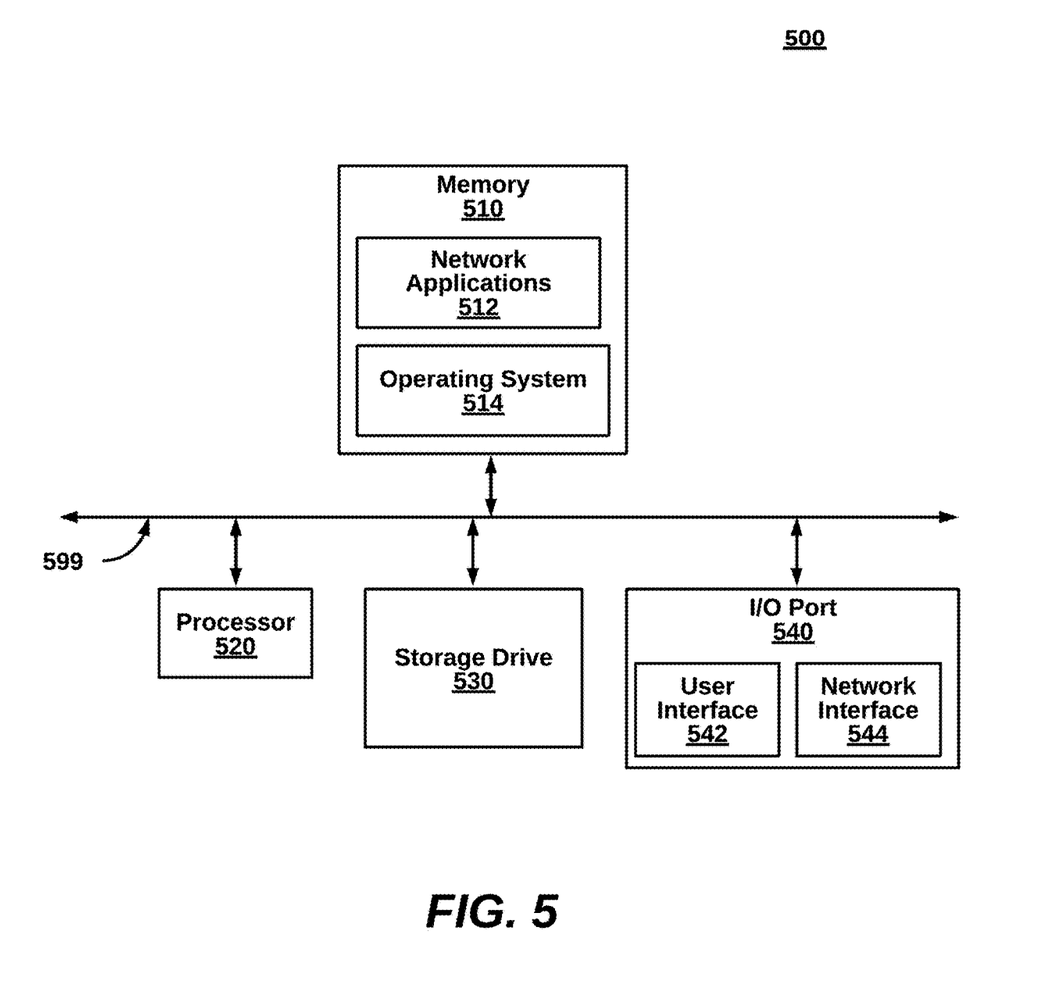
FIG. 5 is a block diagram illustrating an example computing device, according to one embodiment.

The access point 110 physically includes one or more individual access points implemented in any of the computing devices discussed herein (e.g., see FIG. 5). For example, the access point 110 can be an AP 110 or AP 433 (modified as discussed herein) by Fortinet, Inc. of Sunnyvale, Calif. A network administrator can strategically place the access point 120 for optimal coverage area over a locale. The access point 120 can, in turn, be connected to a wired hub, switch or router connected to the enterprise network 199 (or an external network). In embodiment, access point functionality is incorporated into a switch or router. In another embodiment, the access point 110 is a virtual device in whole or in part. Further embodiments of the access point 110 are discussed with respect to FIG. 2.

The controller 130 can store a list of applications and associated priorities, allowing uniform application of ATR adjustments across the network. The access point 120 can first check with the controller 130 for existing determination of ATR adjustments. The access point 120 may make further ATR adjustments from local information or local factors. The controller 130 can also offload parts of the ATR adjustments that could otherwise be performed locally. Many variations are possible.

Additionally, the controller 130 manages the access point 110 and controls stations as they traverse around the network. In one embodiment, a QoS is determined for a particular station while connected to access point 110 and continues to be the QoS when the same station subsequently associates with access points other than the access point 110.

One station, IEEE 802.11a station 130A is typically limited in throughput by the protocol itself. Another station, IEEE 802.11n station 130B has a relatively faster throughput. Yet another station, station 130C includes an airtime fairness app 122 at the client.

Additionally, the stations 130A-C of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/ or software (see e.g., FIG. 5).

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/ or software (see e.g., FIG. 5). No client configuration or download is needed for this particular technique, although a client app can be downloaded for optimizations.

FIG. 2A is a more detailed block diagram illustrating the airtime fairness module 112 of the system 100, according to one embodiment. The access point 110 comprises the airtime fairness module 112, user/device accounts module 210, an optional location tracking module 220, station manager 230, network packet queues and network processors 240, and a network communication module 250.

The airtime fairness module 112 determines adjustments to the default airtime fairness scheme (e.g., equal airtime). In one case, a default airtime fairness value is 1.0 and that value may remain throughout. In another case, a default airtime fairness value is adjusted to 1.33 or 1.5 due to high time sensitivity applications. In yet another case, a default airtime fairness value is adjusted to 0.5 or 0.67 due to low time sensitivity applications. Many different algorithms can be implemented and customized for specific applications.

The network packet queues and network processor 250 take applications into consideration when ordering the network queues, as shown in the detail of FIG. 2B. The standard priority categories are thus given more granularity in awarding airtime. In one embodiment, this is a pre-processing part of the network packet pipeline at an access point. The processor is directed to higher priority tasks in order to improve operation of the network device and the network as a whole.

The airtime fitness module 112 can be implemented, in part, by a specialized ASIC or other computer hardware that is optimized for airtime fairness determinations. In an embodiment, an operating system of the access point 110 is updated with a patch to implement airtime fairness determination. In another embodiment, a separate airtime fitness server (not pictured) is in communication with the access point 110.

The location tracking module 220 determines and tracks locations of users and devices. In some cases, users log on from a known location (e.g., Chicago O'Hare Airport, a certain university network, a specific coffee shop. In other cases, user location can be determined from IP address, or other data exposed by DPI. In some embodiments, devices are tracked independent of specific users. These locations can be sent as inputs to the airtime fairness module 112. As a result, many different policies can be implemented. For instance, closer devices may be given shorter airtime than far away devices, due to an increased flight time for network packets. In one embodiment, a location history is stored for individual IoT apparatus and for specific users in a relational database.

The network communication module 250 includes APIs, networking software and hardware ports and protocols, antenna, and radios needed to communicate with access points, stations, external databases and severs, and the like.

II. Methods for Extending Airtime Fairness in WLANS Based on Application Time Sensitivity (FIGS. 3-4)

Figure 3:
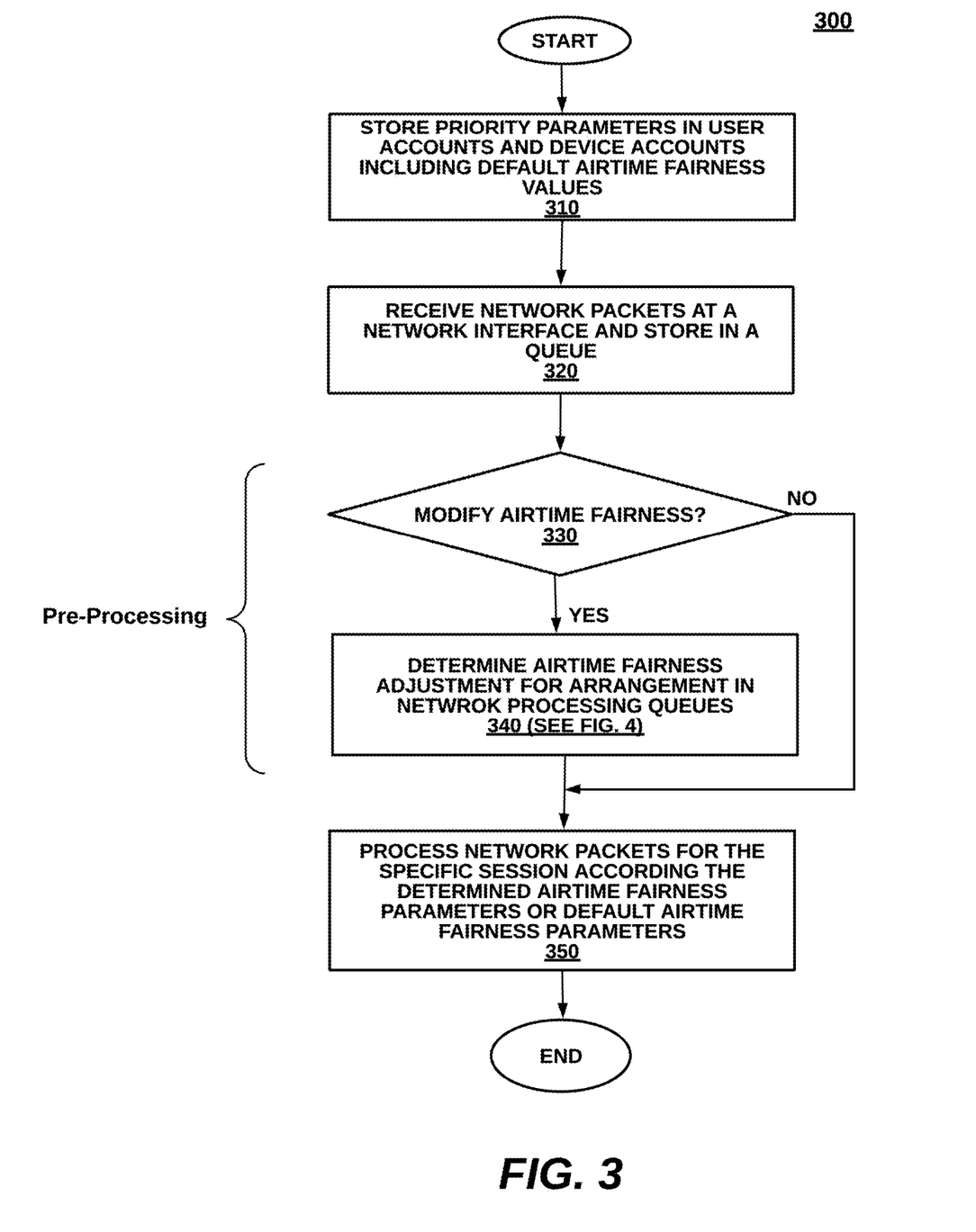
FIG. 3 is a high-level flow diagram illustrating a method for extending application-specific airtime fairness in WLANS based on time-sensitivity of applications, according to one embodiment.
Figure 4:
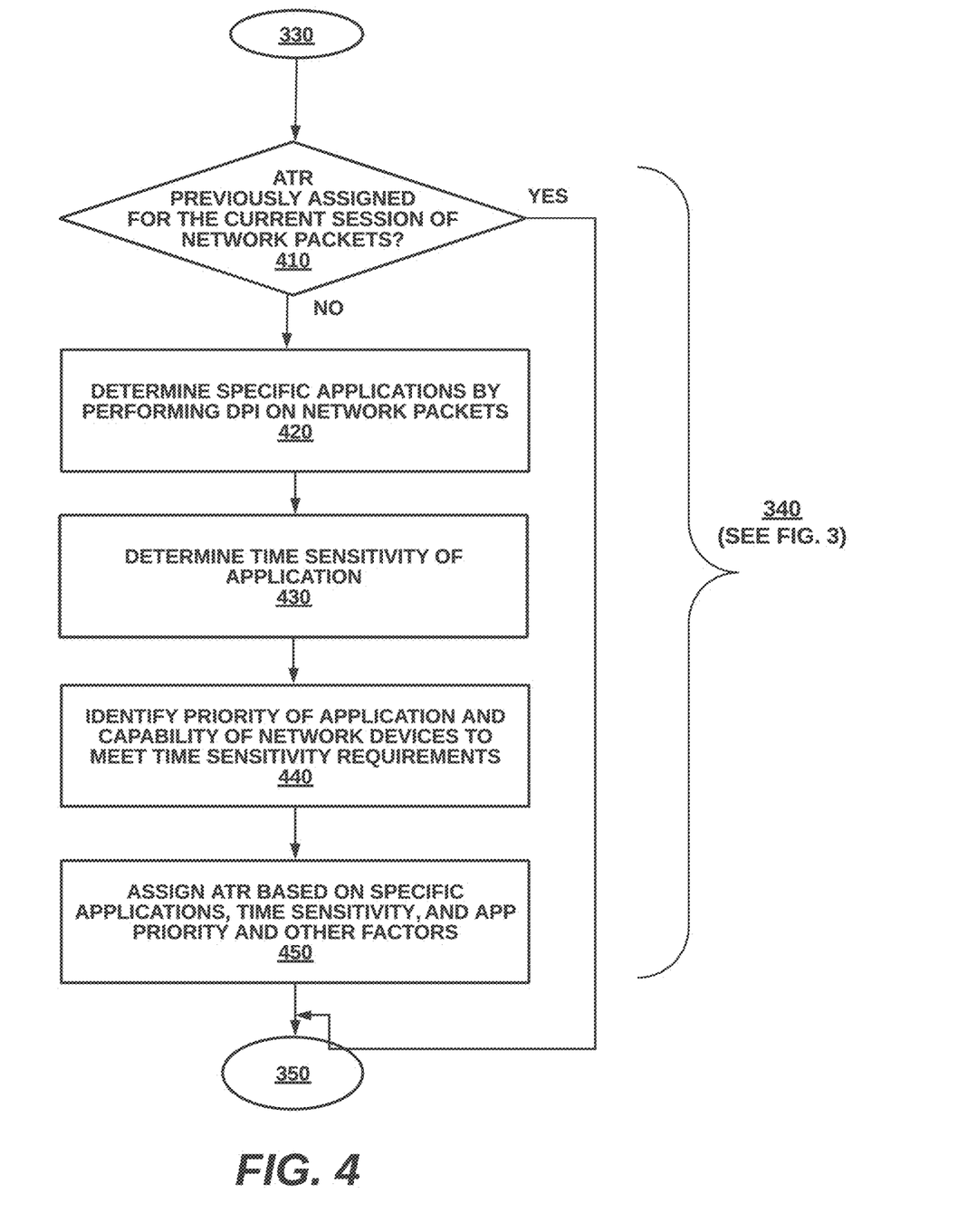
FIG. 4 is a more detailed flow diagram illustrating a step for selectively determining an ATR for quantum of a specific session with a specific wireless station used by a specific user, from the method of FIG. 3, according to one embodiment.

FIG. 3 is a high-level flow diagram illustrating a method 300 for extending airtime fairness in WLANS with selective dynamic allocation of ATR adjustments, according to one embodiment. The method 300 can be implemented by the system 100 of FIG. 1 or a different system. One of ordinary skill in the art will recognize that the method 300 is non-limiting as other embodiments can have more or less steps and can be performed in a different order.

At step 310, a set of default priority parameters is stored for network traffic on the data communication network. A default ATR can be stored for applications. In some cases, a modified ATR has already been determined by another access point and is used as the default ATR. One of ordinary skill in the art will recognize that many other cases are possible. For example, in some cases, no default priority parameters are provided by a controller to an access point.

At step 320, network packets are received at a network interface of the access point and stored in a queue of the access point. The network packets can be associated with a plurality of sessions for network applications executing on the plurality of station. The network interface can be hardware, software, or a combination, as described herein. If unknown, a specific application can be determined from deep packet inspection, session identifiers, application identifiers, MACS, or the like. A network history can provide artificial intelligence input.

At step 330, it is determined whether or not to modify airtime fairness. In one embodiment, artificial intelligence determines airtime fairness based on customized factors. When bypassed, network resources are conserved. When in operation, the network operates more efficiently because time sensitive applications are given a quality of service on application-level.

At step 340, airtime fairness is determined based on time sensitivity and other factors, as set forth in more detail below with respect to FIG. 4.

At step 350, network packets for the specific session of an application are processed using packets in the queue.

FIG. 4 is a more detailed flow diagram illustrating the step 330 for selectively determining an ATR for a specific session with an application executing on a specific wireless station used by a specific user, from the method of FIG. 3, according to one embodiment.

At step 410, if an ATR has already been assigned, the following steps can be bypassed, saving computing resources and time. In some embodiments, an ATR can be updated for a new session of the same device, a new user of the same device, or the same users on different devices, for instance.

At step 420, a specific application associated with a specific session of the network packets locally at the access point without deep packet inspection is determined. The specific application determination is based at least in part on a source IP address, a source port address, a destination IP address, a destination port address and a protocol. Advantageously, the process operates more efficiently to speed up computer hardware and computer networking.

At step 430, time sensitivity of an application is determined. A value can be pre-configured or determined on the fly. Dynamic factors may require periodic updating of the value. A user or network administrator can also manually set the value. In other embodiments, an optional step is performed to determine locations for specific users and specific devices. The specific technique is implementation-specific, but can be based on GPS coordinates, IP address, and the like.

At step 440, a priority of applications is determined, taking time sensitivity into considerations. For example, if time sensitivity is high and throughput of a wireless device executing the application is low, the ATR can be adjusted from 1 to 1.4, for example. In other embodiments, specific users and specific devices are identified. Users can be determined, for example, from log on information or by correlating an IP address used previously. Devices can be determined by MAC address or GPS coordinates, for example.

At step 450, based on the specific application determination, the default ATR is adjusted for the session with a specific station from the set of priority parameters concerning application priority. A higher ATR can result in more packets being stored in the queue for processing and a lower ATR can result in fewer packets being stored in the queue for processing. A higher ATR can also result in more time slots being awarded to a specific application. In one example, a wireless station moves from one access point to a new access point with the same quality of service. This can be in part due to a controller keeping track of the ATR adjustments and transferring that information to preconfigure the new access point. The preconfiguration allows network devices to perform more efficiently.

III. Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, including the access point 110 and the wireless stations 120A-C. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 500, of the present embodiment, includes a memory 510, a processor 520, a storage drive 530, and an I/O port 540. Each of the components is coupled for electronic communication via a bus 599. Communication can be digital and/or analog, and use any suitable protocol.

The memory 510 further comprises network applications 512 and an operating system 514. The network applications 512 can include the modules of the access point 110 and the wireless stations 120A-C, as illustrated in FIGS. 1-2. Other network applications 512 can include a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x74 Edition, Windows Vista, Windows CE, Windows Mobile, Windows 10, Windows 7 or Windows 8), Linux, HP-UX, UNIX, Sun OS, Solaris, Mac OS X, Alpha OS, AIX, IRIX32, or IRIX74. Other operating systems may be used. Microsoft Windows is a trademark of Microsoft Corporation.

The processor 520 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an access point coupled to a plurality of wireless stations on a data communication network, the method for pre-processing adjustments in airtime fairness for improved packet prioritizing during packet processing, the method comprising:
    storing a set of default priority parameters, including a default airtime fairness ratio (ATR), for network traffic on the data communication network;
    receiving network packets, at a network interface of the access point, the network packets associated with a plurality of sessions for network applications executing on the plurality of stations, the network packets stored in a queue;
    determining a specific application associated with a specific session of the network packets locally at the access point without deep packet inspection, the specific application determination based at least in part on a source IP address, a source port address, a destination IP address, a destination port address and a protocol;
    adjusting the ATR on a per-application session basis, the adjustment based on time sensitivity of an application, and comprising:
        making a first ATR adjustment responsive to detecting a time sensitivity of a first application to be high and a throughput of a first station to be low;
        making a second ATR adjustment responsive to detecting a time sensitivity of a second application to be low and a throughput requirement of the second application to be high; and
        making a third ATR adjustment responsive to detecting a time sensitivity of a third application to be low and a throughput requirement of the third application to be low;
    queuing patents in time slots for processing based on the adjusted ATR;
    processing network packets for the specific session of an application using packets in the queue; and
    transmitting the network packets.

2. A non-transitory computer-readable medium to, when executed by a processor, perform a computer-implemented method for pre-processing adjustments in airtime fairness for improved packet prioritizing during packet processing, the method comprising:
    storing a set of default priority parameters, including a default airtime fairness ratio (ATR), for network traffic on the data communication network;
    receiving network packets, at a network interface of the access point, the network packets associated with a plurality of sessions for network applications executing on the plurality of stations, the network packets stored in a queue;
    determining a specific application associated with a specific session of the network packets locally at the access point without deep packet inspection, the specific application determination based at least in part on a source IP address, a source port address, a destination IP address, a destination port address and a protocol;
    adjusting the ATR on a per-application session basis, the adjustment based on time sensitivity of an application, and comprising:
        making a first ATR adjustment responsive to detecting a time sensitivity of a first application to be high and a throughput of a first station to be low;
        making a second ATR adjustment responsive to detecting a time sensitivity of a second application to be low and a throughput requirement of the second application to be high; and
        making a third ATR adjustment responsive to detecting a time sensitivity of a third application to be low and a throughput requirement of the third application to be low;
    queuing patents in time slots for processing based on the adjusted ATR;
    processing network packets for the specific session of an application using packets in the queue; and
    transmitting the network packets.

3. An access point coupled to a plurality of wireless stations on a data communication network, for pre-processing adjustments in airtime fairness for improved packet prioritizing during packet processing, the access point comprising:
    a processor;
    a network interface communicatively coupled to the processor; and
    a memory communicatively coupled to the processor and storing computer code that, when executed by the processor:
        stores a set of default priority parameters, including a default airtime fairness ratio (ATR), for network traffic on the data communication network;
        receives network packets, at a network interface of the access point, the network packets associated with a plurality of sessions for network applications executing on the plurality of stations, the network packets stored in a queue;
        determines a specific application associated with a specific session of the network packets locally at the access point without deep packet inspection, the specific application determination based at least in part on a source IP address, a source port address, a destination IP address, a destination port address and a protocol;
        adjusts the ATR on a per-application session basis, the adjustment based on time sensitivity of an application, and comprising:
            making a first ATR adjustment responsive to detecting a time sensitivity of a first application to be high and a throughput of a first station to be low;

making a second ATR adjustment responsive to detecting a time sensitivity of a second application to be low and a throughput requirement of the second application to be high; and making a third ATR adjustment responsive to detecting a time sensitivity of a third application to be low and a throughput requirement of the third application to be low;

queuing patents in time slots for processing based on the adjusted ATR;

processes network packets for the specific session of an application using packets in the queue; and transmits the network packets.

\* \* \* \* \*